(12) United States Patent
Briggs et al.

(10) Patent No.: US 9,519,836 B2
(45) Date of Patent: Dec. 13, 2016

(54) LOCATING OBJECTS USING IMAGES FROM PORTABLE DEVICES

(71) Applicant: INTERNATIONAL BUSINESS MACHINES CORPORATION, Armonk, NY (US)

(72) Inventors: Simon A. S. Briggs, Winchester (GB); James K. Hook, Bristol (GB); Hamish C. Hunt, Ashford (GB); Nicholas K. Lincoln, Stockbridge (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/467,387

(22) Filed: Aug. 25, 2014

(65) Prior Publication Data
US 2015/0063711 A1 Mar. 5, 2015

(30) Foreign Application Priority Data
Sep. 5, 2013 (GB) .................................. 1315809.2

(51) Int. Cl.
*G06K 9/62* (2006.01)
*G06K 9/00* (2006.01)

(52) U.S. Cl.
CPC ................................ *G06K 9/00979* (2013.01)

(58) Field of Classification Search
CPC ................ G06K 9/00771; G06T 2207/10016; G06T 7/0042; G06T 2207/30232; G06T 7/0044; G06T 7/0046
See application file for complete search history.

(56) References Cited

U.S. PATENT DOCUMENTS

| 6,377,296 B1 * | 4/2002 | Zlatsin et al. ................. 348/143 |
| 8,094,011 B2 | 1/2012 | Faris et al. |
| 8,350,908 B2 | 1/2013 | Morris et al. |
| 8,358,903 B1 | 1/2013 | Meads et al. |

(Continued)

FOREIGN PATENT DOCUMENTS

KR        20100026776        3/2010

OTHER PUBLICATIONS

A. Turpin, "The time of our lives: what we spend our days doing today", www.independent.co.uk, The Independent, May 28, 2005, pp. 1-4.

(Continued)

*Primary Examiner* — Brian P Werner
(74) *Attorney, Agent, or Firm* — Law Office of Jim Boice

(57) ABSTRACT

A method and/or computer program product assists in locating objects using a local physical device and one or more remote physical devices having image capture capability. A local physical device captures one or more reference images of an object, and shares identification metrics associated with one or more reference images of the object with one or more of the remote physical devices. One or more remote physical devices captures one or more images of an area in which the object may be located, and determines, using the identification metrics, whether any of the images captured includes the object. In response to a determination that any of the images captured includes the object, those images are stored and associated with the object. In response to the object being lost by a user, the local physical device reviews the stored images to determine a location of the lost object.

19 Claims, 4 Drawing Sheets

(56) References Cited

U.S. PATENT DOCUMENTS

| | | |
|---|---|---|
| 2003/0126121 A1* | 7/2003 | Khan et al. ............... 707/3 |
| 2011/0096149 A1 | 4/2011 | Au et al. |
| 2011/0153617 A1 | 6/2011 | Uehara |
| 2011/0273568 A1* | 11/2011 | Lagassey ............ G07C 5/008 348/159 |
| 2012/0230544 A1 | 9/2012 | Gabara |
| 2013/0015971 A1 | 1/2013 | Caporizzo |
| 2013/0162389 A1 | 6/2013 | Crucs |

OTHER PUBLICATIONS

G. Thom, "New CSIRO sensor technology will let you ask a computer to find lost objects", heraldsun.com, Herald Sun, Feb. 11, 2010, pp. 1-2.

F. Belloni et. al, "Angle-based indoor positioning system for open indoor environments", 6th Workshop on Positioning, Navigation and Communication, IEEE, Mar. 2009, pp. 261-265.

Anonymous, "Outlne of Object Recognition", retrieved Aug. 18, 2014, pp. 1-8, Wikipedia.org, Wikimedia Foundation, Inc.

S. Nirjon et al., "Kinsight: Localizing and Tracking Household Objects Using Depth-Camera Sensors", IEEE, 8th International Conference on Distributed Computing in Sensor Systems, 2012, pp. 67-74.

Anonymous, "New Coin-Sized Device and Smartphone App Helps Users Track and Find Their Lost Wallets, Keys, Phones, and More", PRWeb, May 13, 2013, pp. 1-2.

IBM, "A Method of Intercommunication Between Groups of Personal Items to Prevent Loss", IPCOM000180988D, IP.com, Mar. 23, 2009, pp. 1-7.

* cited by examiner

LOCATING OBJECTS USING IMAGES FROM PORTABLE DEVICES

BACKGROUND

The present invention relates to locating objects using images from portable devices, and more particularly to locating objects by reviewing images from more than one portable device of the objects against their background.

Many people lose essential objects every day. Such essential objects may include remote controls, wallets, keys, toys, books or even mobile phones. Each of these objects are easy to move and easy to lose. Often a user may pick up the object, use the object, move the object and put the object down in a different place. The different place where the object is put down is easily forgotten. A user looking for the lost object typically looks for the object at the location where they picked it up and cannot remember where they moved it to and put it down.

Known prior art discloses a system for locating lost objects that requires the attachment of a small sensor to each of the objects that it is desired to locate if they are lost. The attachment of a small sensor to each of the objects can be awkward for small items, such as keys. There are other similar solutions that focus on a physical sensor or similar attached to the object in question that it is desired to be able to find if lost.

Known prior art discloses a method for finding misplaced objects using a database and instructions generated by a portable device. Immobile objects such as doors and windows can be recognized in images from a portable device and are used to provide key position anchor locations. Less immobile objects such as tables and refrigerators serve as a secondary level of anchor framework. A target that is an object that is mobile and typically small, is imaged and scanned into a database. When an object is lost, the database is scanned for images of the object and the user is provided with directions to the target.

SUMMARY

In one embodiment of the present invention, a method and/or computer program product assists in locating objects using a local physical device and one or more remote physical devices, the local physical device and the one or more remote physical devices having image capture capability. A local physical device captures one or more reference images of an object, and shares identification metrics associated with one or more reference images of the object with one or more of the remote physical devices. One or more remote physical devices captures one or more images of an area in which the object may be located, and determines, using the identification metrics, whether any of the one or more images captured includes the object. In response to a determination that any of the one or more images captured includes the object, one or more of the one or more images are stored as stored images, and associated with the object. In response to the object being lost by a user, the local physical device reviews one or more of the stored images associated with the object to determine a location of the lost object.

In one embodiment of the present invention, a system for use with a local and one or more remote physical devices having image capture capability assists in locating objects. The system comprises: a local physical device having: an image capture portion for capturing one or more reference images of the object; a communication portion for sending identification metrics associated with the one or more reference images of the object with one or more of the remote physical devices and for receiving one or more images of an area around the one or more remote physical devices associated with the object from the one or more remote physical devices; and a review portion for reviewing one or more of the stored images associated with the object to determine the location of the lost object, the one or more images being captured by the one or more remote physical devices. The system also includes one or more remote physical devices having: an image capture portion for capturing one or more images of an area around the one or more remote physical devices; a comparison portion for determining, using the one or more reference images, whether any of the one or more images captured includes the object and responsive to a determination that any of the one or more images captured includes the object, storing one or more of the one or more images and associating the stored images with the object; and a communication portion for receiving identification metrics and sending one or more images of an area around the one or more remote physical devices associated with the object.

BRIEF DESCRIPTION OF THE SEVERAL VIEWS OF THE DRAWINGS

Preferred embodiments of the present invention will now be described in more detail, by way of example only, with reference to the accompanying drawings, in which.

DETAILED DESCRIPTION

Figure 1:
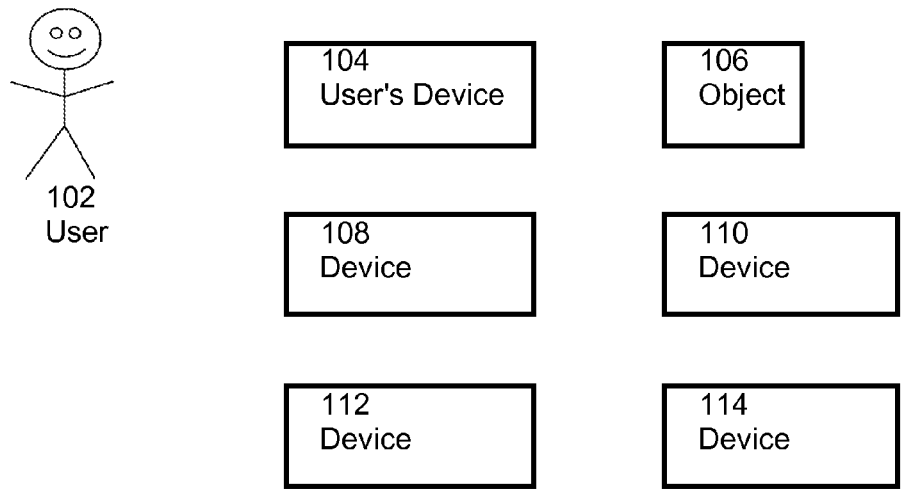
FIG. 1 shows an environment in which embodiments of the present invention may be practiced.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, a user 102 is shown. The user 102 has a device 104 which has image capture capability. Such a device 104 may be a camera, a smartphone or even a watch. The device 104 requires either some processing capability or a data link to some other entity having processing capability. Also shown is an object 106, which is typically a small to medium size object which is portable and may be mislaid or lost. Examples may include keys, wallets, remote controls or any other moveable object, but can include any object whose location may change and therefore may be mislaid or lost. In an embodiment, the object may be a person.

Figure 2:
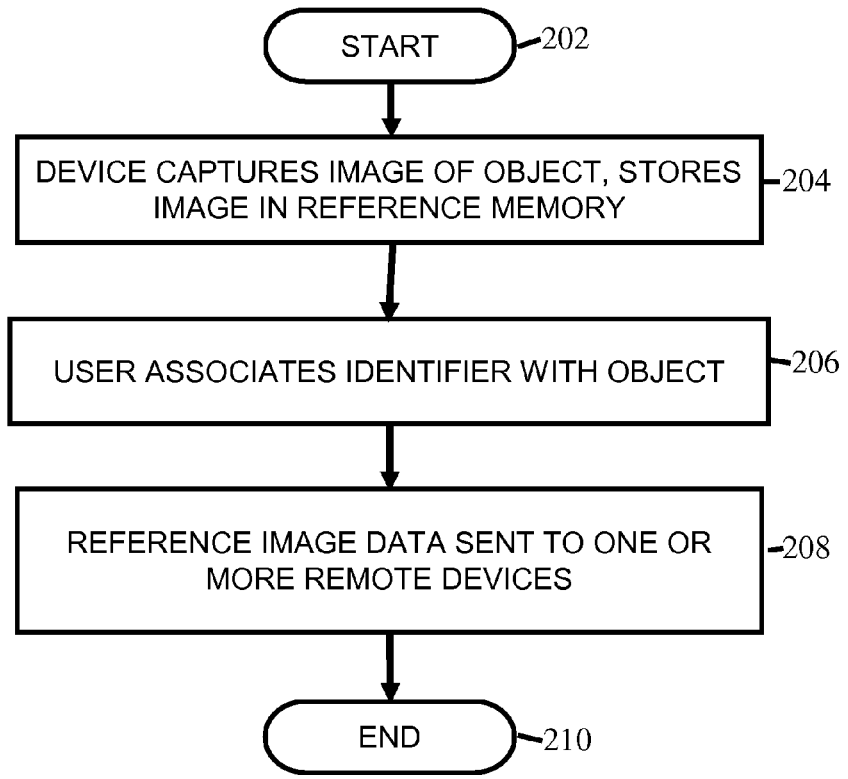
FIG. 2 shows a flow chart of a pre-recording stage of an embodiment of the present invention.

FIG. 2 shows a flow chart of a pre-recording stage of an embodiment of the present invention. This is a "learning" stage that is performed for each object that may want to be found at a later time if it is lost. The embodiment starts at step 202. At step 204, the user's device 104 captures an image of the object 106. The captured image data (708 in FIG. 6) is then stored in reference memory (602 in FIG. 5). The captured image data 708 may comprise a single image or it may comprise a plurality of images showing various views of the object 106. The plurality of images may, optionally, be processed using a conventional object recognition algorithm to produce identification metrics. At step 206, the user 102 associates an identifier (702 in FIG. 6) with the captured image data (708 in FIG. 6) stored in the reference memory 602. If the image has been processed to produce identification metrics, then the identifier 702 may be associated with those identification metrics instead of the image.

At step 208, reference image data associated with the object is sent by the communication portion 610 of the local device 104 to one or more other devices such as the remote devices 108-114 shown in FIG. 1. Such reference image data may be the image data 708 stored in reference memory 602 or it may be identification metrics derived from the image data 708. The use of such identification metrics may allow smaller quantities of data to be transferred to the one or more remote devices 108-114. The sending of reference image data to one or more remote devices 108-114 has the advantages that in the event of the object 106 being lost, only a reference to the reference image data need be sent to the one or more remote devices 108-114 and that the one or more remote devices 108-114 may pre-emptively store information concerning the location of the object 106 before the user 102 indicates that the object 106 has been lost. This may simplify and/or speed up a subsequent search for the object 106. Processing ends at step 210.

Figure 3:
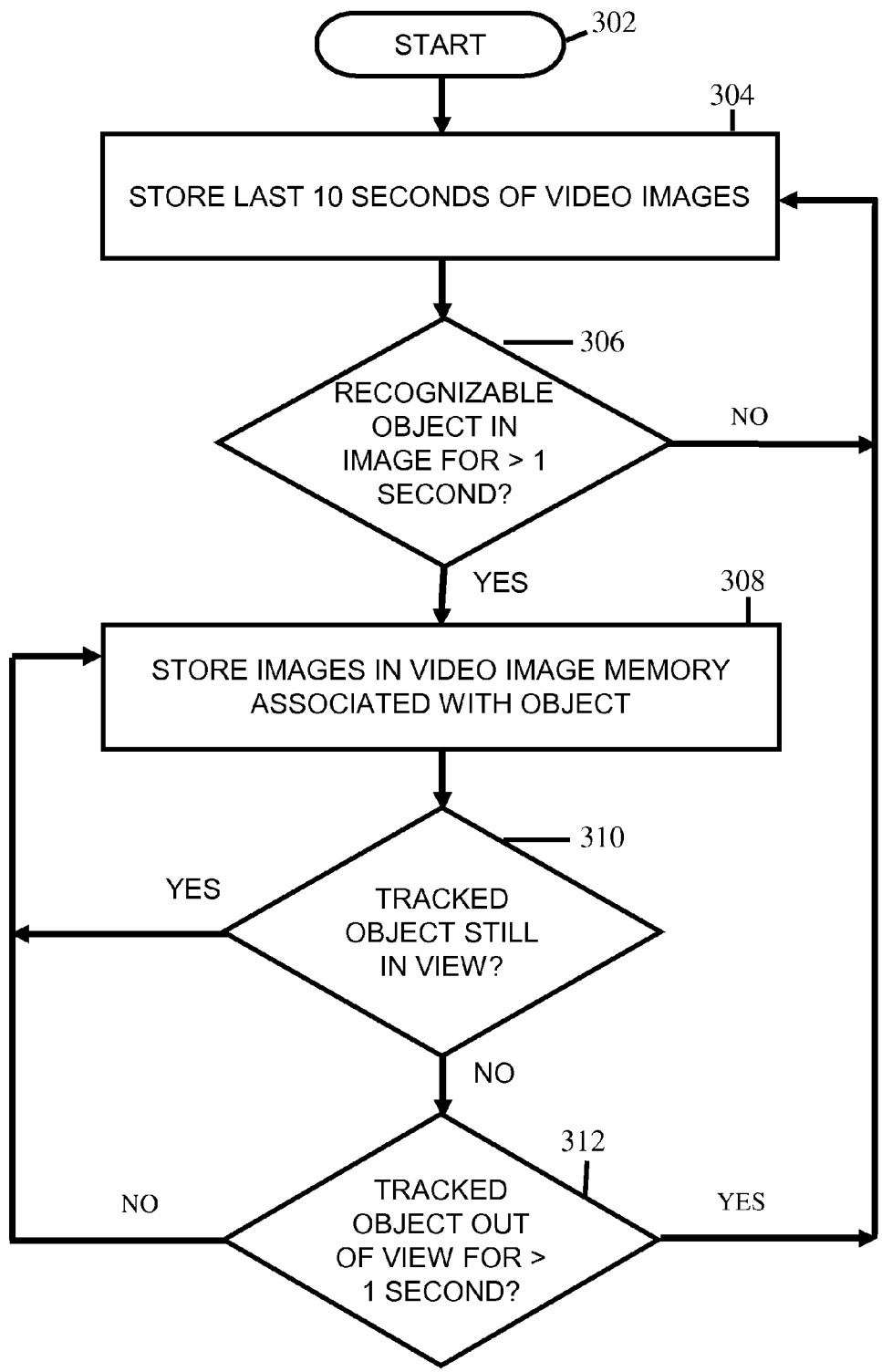
FIG. 3 shows a flow chart of a live recording stage of an embodiment of the present invention.
Figure 5:
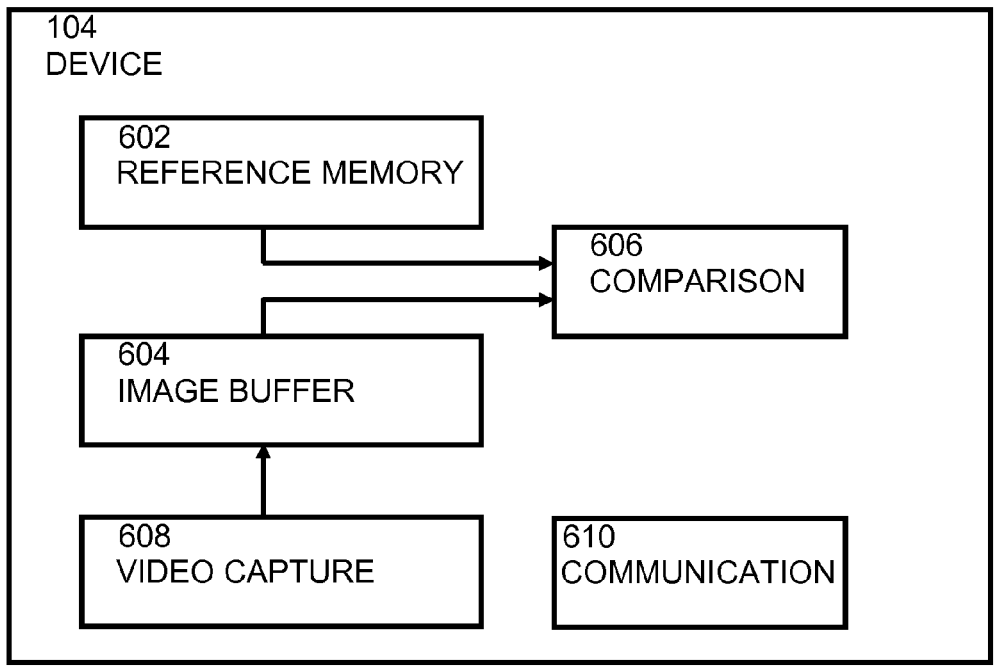
FIG. 5 shows a partial block diagram of the device shown in FIG. 1.

FIG. 3 shows a flow chart of a live recording stage of an embodiment of the present invention. This is an "acquisition" stage that is continuously performed to stockpile images of where objects 106 are located. An embodiment of a method of the present invention starts at step 302. At step 304, the last 10 seconds of video images are captured by a video capture portion (608 in FIG. 5) in the device 104 and stored in an image buffer (604 in FIG. 5). Referring briefly to FIG. 5 which shows a partial block diagram of some of the relevant portions of the device 104 including reference memory 602, image buffer 604, comparison 606 and video capture 608. Returning to FIG. 3, the image buffer 604 may be in a circular buffer, that is, when 10 seconds of video is buffered, the earliest portion of the 10 seconds of buffered video is overwritten by the latest video images. The buffer 604 may optionally be less than 10 seconds of storage, it may optionally be more. In a preferred embodiment, the period is 10 seconds because this is typically a long enough period for a location to be recognized but a short enough period to be most efficient for data storage and analysis. In other embodiments of the present invention, single or multiple images may be used in place of video images. For example, images similar to those used in time lapse photography may be captured at regular intervals of, for example, one second. References to video images in this specification are intended to include such single or multiple images.

At step 306, a check is made to see if there is a recognizable object 106 which has appeared in the video images for at least one second. This check is made by the comparison portion (606 in FIG. 5) of the device 104 comparing image data (708 in FIG. 6) of recognized objects stored in a reference memory portion (602 in FIG. 5) with objects that appear in the video images stored in the image buffer portion (604 in FIG. 5) of the device 104. The video images may be processed using a conventional object recognition algorithm such as that used in the pre-recording stage described above with reference to FIG. 2. In a preferred embodiment, an object has to appear in the video images for at least one second before it is a recognizable object in order to prevent spurious errors. However, this limitation is optional and the check may simply be made for a recognizable object appearing in any single video image, or a different period may be used. It may easily be determined by experiment by the skilled person in the art what the best period is by selecting a period optimized to reduce or eliminate spurious errors.

If there are no recognizable objects in the video images stored in the image buffer portion (604 in FIG. 5) of the device 104, then processing returns to step 304 and more video images are captured and stored. If there are one or more recognizable objects in the video images stored in the image buffer portion (604 in FIG. 5) of the device 104, then processing proceeds to step 308. At step 308, the captured images are stored in video image memory (704 in FIG. 6) associated with the recognizable object, or with each of the recognizable objects if there are more than one.

Figure 6:
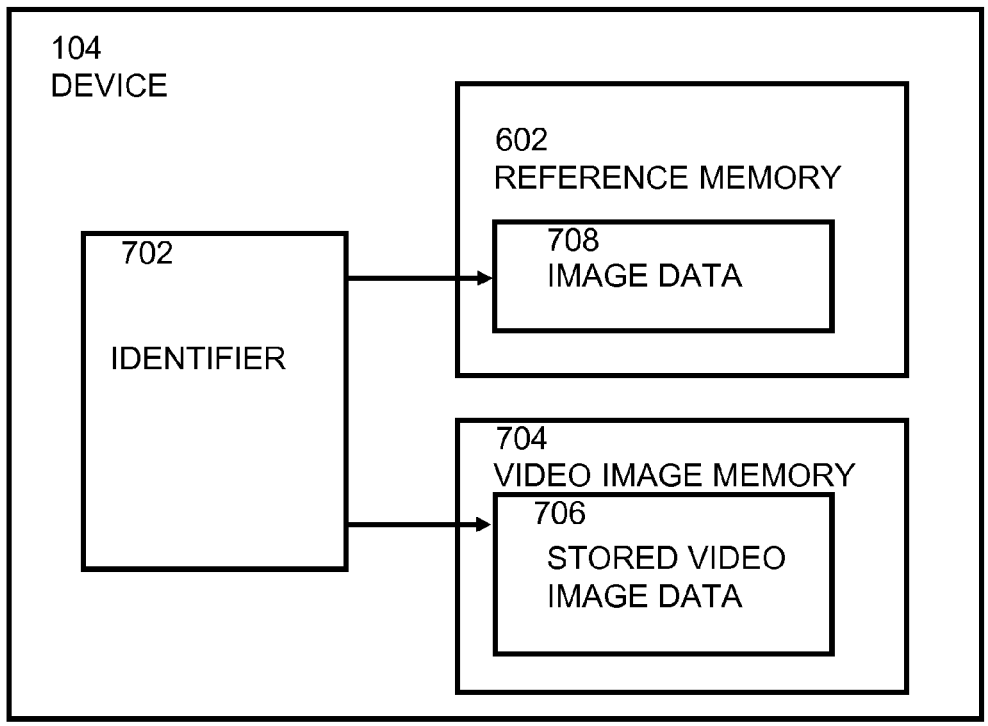
FIG. 6 shows a partial data structure used in the device shown in FIG. 1.

Referring briefly to FIG. 6, each object 106 that the user 102 desired to be able to recognize had image data 708 stored in reference memory 602 in device 104 during the pre-recording stage described above with reference to FIG. 2. Each image or set of images was associated with an identifier 702 at step 206 in FIG. 2. The captured images of the recognizable object which are stored in video image memory 704 are associated with the identifier 702 of the recognizable object. In this way, given image data 708 of a recognizable object 106 stored in reference memory 602, an identifier 702 can be found. That identifier 702 can then be used to find stored image data 706 of the recognizable object.

Referring back to FIG. 3, at step 310, a check is made to see if the recognizable object 106 being tracked and for which images are being stored in the image buffer 604 still appears in the video images. If the recognizable object 106 continues to appear in the video images, then processing returns to step 308. If the recognizable object does not appear in the video images, then, at step 312, a check is made to see if the recognizable object being tracked is out of view for more than one second. If the recognizable object being tracked is not out of view for more than one second, then processing returns to step 308. If the recognizable object being tracked is out of view for more than one second, then storage of further images in the image buffer 604 associated with the object 106 stops. A snapshot of the image buffer 604 is saved in the stored images 706 of the video image memory 704 together with the identifier 702 of the object 106. More than one object 106 may appear in the video images and so there may be saving of a snapshot of the image buffer 604 to the stored image 706 with the identifier 702 of a first object together concurrently with continued storing of images in a circular buffer associated with a second object. Processing returns to step 304.

In a preferred embodiment, an object 106 has to appear in the video images for at least one second before it is a recognizable object in order to prevent spurious errors. However, this limitation is optional and the check may simply be made for a recognizable object not appearing in any single video image, or a different period may be used. It may easily be determined by experiment by the skilled person in the art what the best period is by selecting a period optimized to reduce or eliminate spurious errors. The embodiment of a method of the present invention finishes when video images are no longer being recorded, such as when a device 104 is shutdown.

Figure 4:
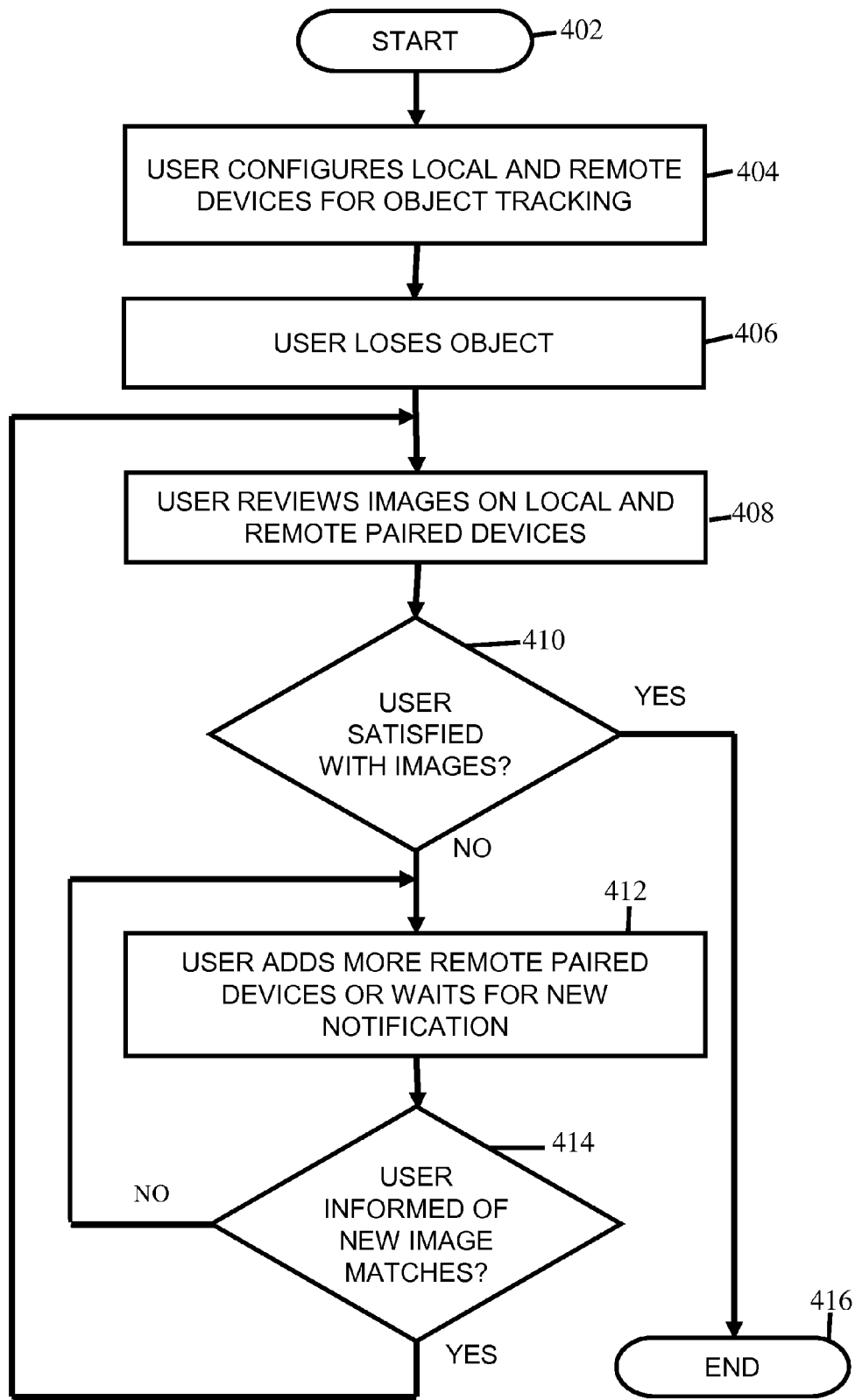
FIG. 4 shows a flow chart of a user query stage of an embodiment of the present invention.

FIG. 4 shows a flow chart of a user query stage of an embodiment of a method according to the present invention. This is a "search" stage carried out when an object 106 which was learned by the system in the "learning" stage described with reference to FIG. 2 above has been lost. It uses the video images acquired during the "acquisition" stage described with reference to FIG. 3 above. The video images are reviewed to try and identify the lost object in the stored video images. The embodiment starts at step 402. At step 404, a user configures local and remote devices for object tracking. This configuration may include the sending of identification metrics associated with the one or more reference images of the object. The identification metrics may be the one or more reference images themselves or they may be metrics derived from the one or more reference images. In an embodiment, the local device is used only for capturing reference images and not for capturing images of the area in which the object may be located. In another embodiment, the local device is used for both capturing reference images and for capturing images of the area in which the object 106 may be located. At step 406, a user 102 loses an object 106. At step 408, a user 102 looks up the lost object 106 and reviews the image data 708 stored in the reference memory 602 of the local device 104 and of remote devices 108-114. If the user 102 identifies that one of the image data 708 in the reference memory 602 of the local device 104 or of the remote devices 108-114 corresponds to the lost object, then that image data 708 is selected. Such identification may be by selection from a textual list, by selection of an image or by any other means. The user 102 reviews the stored images 706 in the video image memory 704. The stored images reviewed are a subset of the entirety of the stored images 706 stored in the video image memory 704 and can be, for example, a most recent 10 seconds of video images recorded of the object 106. The review may also include information about the time that the reviewed images were recorded. The subset reviewed is determined by the identifier 702 associated with the image data 708 in the reference memory 602 that was identified by the user 102 as corresponding to the lost object 106 in step 406. Stored images 706 in the video image memory 704 which have the same identifier 702 associated with them are selected for the subset reviewed by the user 102.

At step 410, a determination is made as to whether the user 102 is satisfied with the images reviewed. A user 102 will be satisfied if one or more of the stored images 706 in the video image memory 704 includes the object 106 that was lost in the stored image 706 and if the user 102 can recognize the location or background seen in the stored image 706 where the lost object 106 was last captured in a stored image 706. If the user 102 is satisfied, then they will be able to retrieve the lost object 106 and the embodiment of the method of the present invention stops at step 416. In a preferred embodiment, the user's device 104 informs the one or more remote devices 108-114 that the lost object 106 has now been found. A user 102 will not be satisfied if the user 102 cannot recognize the location or background seen in the stored image 706 where the lost object 106 was last captured. If the user 102 is not satisfied, then the embodiment of the method of the present invention moves to step 412.

At step 412, reference image data associated with the lost object 106 is sent to further one or more remote devices 108-114. Such reference image data may be the image data 708 stored in reference memory 602 or it may be identification metrics derived from the image data 708. The use of such identification metrics may allow smaller quantities of data to be transferred. Metadata may be associated with reference image data 708 including metadata that may indicate whether the request is urgent. The one or more remote devices 108-114 can then assist in a search without any input from the user of the one or more remote devices 108-114 or even any knowledge by the user of the one or more remote devices 108-114 as to what is being searched for. The user of the one or more remote devices 108-114 does not need to know what is being searched for and the system can, if desired, be configured so as not to allow the user of the one or more remote devices 108-114 to view what is being searched for and/or the video images returned to the requesting device 104.

The one or more remote devices 108-114 to which reference image data 708 is sent to may be determined by a profile accessible to the user's device 104. The profile may be stored on the user's device 104 or it may be stored somewhere else that is accessible to the user's device 104, such as a central server. The profile may have different settings for different ones of the one or more remote devices 108-114. In a particular example, there may be one or more remote devices 108-114 in a "trusted" category, typically belonging to family or close friends. Such devices 108-114 may be sent reference image data 708 to assist with a search for small private objects such as keys. There may be one or more devices 108-114 in a "local" category of devices located local to the user's device 104. Such devices 108-114 may be used to search for a lost child whose location is known to be in the area local to the device 104. Such a search for a lost child is likely, but not necessarily, to be tagged as "urgent". In this example, it is particularly advantageous if the profile is stored somewhere else that is accessible to the user's device 104 such as a shared profile storage storing the profiles of multiple user's devices. There may be one or more devices 108-114 in a "national" category of devices located anywhere in a country or a state. Such devices may be used to search for a dangerous person or object whose location may be anywhere in the country or in the state.

Profiles associated with user's device 104 or one or more remote devices 108-114 may have an option to be set to "open" so as to receive requests for such "local" or "national" searches or they may be set to "closed" so as not to receive such requests and not to participate in such searches. When reference image data 708 is to be sent to one or more remote devices 108-114, specific devices may be excluded, so the reference image data 708 could go to all "trusted" devices except one. An advantage of such an implementation is that the search area or environment is not limited by geography or by the availability of a fixed infrastructure. In an extreme case, a search area may be worldwide by any device that participates in the lost object location service. Communication between the user's device 104 and any of the one or more remote devices 108-114 may be by wi-fi, by internet, by mobile telephony or any other means.

At step 414, a check is made as to whether one or more of the one or more remote devices 108-114 has sent information to the user's device 104 indicating that the lost object 106 has been seen in a captured image. Any of the one or more remote devices 108-114 may store the image data 706 or it may send this image data 706 to the user's device 104 or to a central store of image data. If a new image match has been sent to the user, then processing returns to step 408 for the user to review the image. If no new image match has been sent to the user, then processing returns to step 412 to add an additional one or more devices 108-114 to the search or to wait for a new notification.

Disclosed is a method for assisting in locating objects using one or more images from portable devices by initially capturing reference images of the object and then capturing one or more images of the object inclusive of context background. The one or more reference images are used to determine whether any of the one or more images captured includes the object and if so they are stored and associated with the object. The reference images are shared with remote devices, which perform the same function as the local device. The devices may be time synchronized so that the latest of the one or more images may be identified. If the object is lost, the stored images on local and remote devices are reviewed to determine its location. If the location is not determined, then an increasing number of remote devices are reviewed to determine its location. If the location is not determined, then an increasing number of remote devices may be added with notifications passed to the local device if the lost object is detected by a remote device.

Embodiments of the present invention comprise a method for assisting in locating objects using a local and one or more remote devices, the devices having image capture capability, the method comprising the steps of: capturing, by the local device, one or more reference images of the object; sharing, by the local device, identification metrics associated with the one or more reference images of the object with one or more of the remote devices; capturing, by the one or more of the remote devices, one or more images of an area in which the object may be located; determining, by the one or more of the remote devices, using the identification metrics, whether any of the one or more images captured includes the object; responsive to a determination that any of the one or more images captured includes the object, storing one or more of the one or more images and associating the stored images with the object; and responsive to the object being lost, reviewing, by the local device, one or more of the stored images associated with the object to determine the location of the lost object.

This has the advantage that the finding of lost objects is facilitated without the need for the lost object to have any sensor attached to it. The object merely needs to have been "learnt" by the user's device. It also has the advantage that a number of remote devices may be used to facilitate the search and thus increase the scope of the search area or increase the depth of the search, or both.

In a preferred embodiment, the local device captures one or more images of an area in which the object may be located and determines, using the identification metrics, whether any of the one or more images captured includes the object. This has the advantage that the local device participates in the search as well as the remote devices.

This has the advantage that a number of remote devices may be used to facilitate the search and thus increase the scope of the search area or increase the depth of the search, or both.

Embodiments of the present invention also provide a system for use with a local and one or more remote devices, the devices having image capture capability, for assisting in locating objects, the system comprising: a local device having a capture portion for capturing one or more reference images of the object; a communication portion for sending identification metrics associated with the one or more reference images of the object with one or more of the remote devices and for receiving one or more images of an area around the one or more remote devices associated with the object from the one or more remote devices; and a review portion for reviewing one or more of the stored images associated with the object to determine the location of the lost object, the one or more images being captured by the one or more remote devices; and one or more remote devices having: an image capture portion for capturing one or more images of an area around the one or more remote devices; a comparison portion for determining, using the one or more reference images, whether any of the one or more images captured includes the object and responsive to a determination that any of the one or more images captured includes the object, storing one or more of the one or more images and associating the stored images with the object; and a communication portion for receiving identification metrics and sending one or more images of an area around the one or more remote devices associated with the object.

In a preferred embodiment of the system, the image capture portion of the local device captures one or more images of an area in which the object may be located and determines, using the identification metrics, whether any of the one or more images captured includes the object.

Embodiments of the present invention further provide a computer program product for assisting in locating objects, the computer program product comprising: a computer readable storage medium having computer readable program code embodied therewith, the computer readable program code adapted to perform the method described above when said program is run on a computer.

What is claimed is:

1. A method for assisting in locating objects using a local physical device and one or more remote physical devices, the local physical device and the one or more remote physical devices having image capture capability, the method comprising:
    capturing, by the local physical device, one or more reference images of an object;
    sharing, by the local physical device, identification metrics associated with one or more reference images of the object with one or more of the remote physical devices;
    specifying the one or more remote physical devices according to a profile of the one or more remote physical devices, wherein the profile identifies a level of trustworthiness and a physical location of the one or more remote physical devices;
    capturing, by the one or more of the remote physical devices, one or more images of an area in which the object may be located;
    determining, by one or more of the one or more remote physical devices and using the identification metrics, whether any of the one or more images captured includes the object;
    in response to a determination that any of the one or more images captured by the one or more of the remote physical devices includes the object, storing one or more of the one or more images as stored images, and associating the stored images with the object; and
    in response to the object being lost by a user, reviewing, by the local physical device, one or more of the stored images associated with the object to determine a location of the lost object.

2. The method as claimed in claim 1, further comprising:
    capturing, by the local physical device, one or more images of an area in which the object may be located; and
    determining, by the local physical device and using the identification metrics, whether any of the one or more images captured includes the object.

3. The method as claimed in claim 1, further comprising:
    assigning an identifier to captured one or more images of the object, the identifier being associated with the object; and wherein:
        the stored images are associated with the identifier; and
        the one or more of the stored images to be reviewed are determined using the assigned identifier.

4. The method as claimed in claim 1, wherein the one or more images captured by the one or more of the remote physical devices is a video that is stored on a circular buffer, wherein the circular buffer only stores a latest 10 seconds of the video.

5. The method as claimed in claim 1, further comprising:
in further response to the object being lost, determining, by the local physical device and in real time, whether any of the one or more images captured includes the lost object; and
in response to determining that one or more images captured includes the lost object, transmitting a message indicating that an image of the lost object has been captured.

6. The method as claimed in claim 1, wherein the identification metrics cannot be viewed on the one or more remote physical devices.

7. The method as claimed in claim 1, further comprising:
in response to the object being lost by a user, the one or more remote physical devices determining in real time whether any of the one or more images captured includes the lost object; and
in response to the one or more remote physical devices determining in real time that any of the one or more images captured includes the lost object, transmitting a message to the local physical device indicating that an image of the lost object has been captured.

8. The method as claimed in claim 1, further comprising:
configuring the one or more remote physical devices to prevent a user of the one or more physical devices from viewing the one or more of the stored images associated with the object.

9. The method as claimed in claim 1, wherein the identification metrics associated with the one or more reference images of the object shared with the one or more remote physical devices are the reference images of the object.

10. A system for use with a local physical device and one or more remote physical devices, the local physical device and the one or more remote physical devices having image capture capability, for assisting in locating objects, the system comprising:
a local physical device having:
an image capture portion for capturing one or more reference images of the object;
a communication portion for sending identification metrics associated with the one or more reference images of the object with one or more of the remote physical devices and for receiving one or more images of an area around the one or more remote physical devices associated with the object from the one or more remote physical devices, and wherein the one or more images of the area are stored images;
a review portion for reviewing one or more stored images associated with the object to determine the location of the lost object, the one or more stored images being captured by the one or more remote physical devices; and
one or more remote physical devices having:
an image capture portion for capturing one or more images of an area around the one or more remote physical devices;
a comparison portion for determining using the one or more reference images, whether any of the one or more images captured includes the object and responsive to a determination that any of the one or more images captured includes the object, storing one or more of the one or more images as stored images and associating the stored images with the object; and
a communication portion for receiving identification metrics and sending one or more images of an area around the one or more remote physical devices associated with the object, wherein the one or more remote physical devices are specified according to a profile of the one or more remote physical devices, and wherein the profile identifies a level of trustworthiness and a physical location of the one or more remote physical devices.

11. The system as claimed in claim 10, wherein the image capture portion of the local physical device captures one or more images of an area in which the object may be located and determines, using the identification metrics, whether any of the one or more images captured includes the object.

12. The system as claimed in claim 10, further comprising an identifier associated with the captured one or more images of the object, the identifier being associated with the object; and
wherein:
the stored images are associated with the identifier; and
one or more of the stored images to be reviewed are determined using the assigned identifier.

13. The system as claimed in claim 10, wherein the stored images comprises a portion of video.

14. The system as claimed in claim 10, wherein the comparison portion associates a time with the stored images.

15. The system as claimed in claim 10, wherein further responsive to the object being lost, the local physical device determines in real time whether any of the one or more images captured includes the lost object and responsive to the determination, indicates that an image of the lost object has been captured.

16. The system as claimed in claim 10, wherein the stored images cannot be viewed on the one or more remote physical devices.

17. The system as claimed in claim 10, wherein further responsive to the object being lost, the one or more remote physical devices determine in real time whether any of the one or more images captured includes the lost object and responsive to the determination, indicate to the local physical device that an image of the lost object has been captured.

18. The system as claimed in claim 10, wherein the identification metrics associated with the one or more reference images of the object shared with the one or more remote physical devices are the reference images of the object.

19. A computer program product for assisting in locating objects using a local physical device and one or more remote physical devices, the local physical device and the one or more remote physical devices having image capture capability, the computer program product comprising a computer readable storage medium having program code embodied therewith, wherein the computer readable storage medium is not a transitory signal per se, and wherein the program code is readable and executable by a processor to perform a method comprising:
capturing, by the local physical device, one or more reference images of an object;
sharing, by the local physical device, identification metrics associated with one or more reference images of the object with one or more of the remote physical devices;
specifying the one or more remote physical devices according to a profile of the one or more remote physical devices, wherein the profile identifies a level of trustworthiness and a physical location of the one or more remote physical devices;
capturing, by the one or more of the remote physical devices, one or more images of an area in which the object may be located;

determining, by one or more of the one or more remote physical devices and using the identification metrics, whether any of the one or more images captured includes the object;

in response to a determination that any of the one or more images captured by the one or more of the remote physical devices includes the object, storing one or more of the one or more images as stored images, and associating the stored images with the object; and in response to the object being lost by a user, reviewing, by the local physical device, one or more of the stored images associated with the object to determine a location of the lost object.

* * * * *